United States Patent [19] [11] 3,886,650
Cobaugh et al. [45] June 3, 1975

[54] METHOD AND APPARATUS FOR PRECRIMPING SOLDER RINGS ON ELECTRICAL TERMINAL POSTS

[75] Inventors: Robert Franklin Cobaugh, Elizabethtown; James Ray Coller, Mechanicsburg, both of Pa.

[73] Assignee: AMP Incorporated, Harrisburg, Pa.

[22] Filed: May 2, 1974

[21] Appl. No.: 466,322

Related U.S. Application Data

[63] Continuation-in-part of Ser. No. 455,765, March 28, 1974, abandoned.

[52] U.S. Cl................ 228/136; 29/628; 29/630 C; 29/509; 29/203 DT; 228/223; 228/245
[51] Int. Cl.............................................. B23k 31/02
[58] Field of Search....... 29/471.3, 471.1, 480, 502, 29/203 D, 203 DT, 509, 521, 630 R, 630 C, 628

[56] References Cited
UNITED STATES PATENTS

| | | |
|---|---|---|
| 2,706,328 | 4/1955 | Karmazin.......................... 29/501 X |
| 3,393,437 | 7/1968 | Hutchinson et al................ 29/509 X |
| 3,433,892 | 3/1969 | Elbindari......................... 29/509 X |
| 3,750,265 | 8/1973 | Cushmann......................... 29/471.3 |
| 3,780,433 | 12/1973 | Lynch.............................. 29/628 |

Primary Examiner—Al Lawrence Smith
Assistant Examiner—K. J. Ramsey
Attorney, Agent, or Firm—William J. Keating, Esq.; Donald W. Phillion, Esq.

[57] ABSTRACT

A strip of heated terminal posts are attached to a common carrier and a vertically positioned ribbon of solder are supplied simultaneously to a first pair of rollers which presses the heated terminal posts into the edge of, but not through, the vertically positioned solder ribbon. Next, the strip of terminal posts, with the solder ribbon attached, is passed through a second set of rollers which crimp the solder ribbon together midway between terminal posts to force the solder further around the terminal posts, thereby ensuring that the same amount of solder will flow around each terminal post when the terminal posts are gang inserted in a printed circuit board and the solder melted.

27 Claims, 8 Drawing Figures

METHOD AND APPARATUS FOR PRECRIMPING SOLDER RINGS ON ELECTRICAL TERMINAL POSTS

CROSS REFERENCE TO RELATED APPLICATION

This application is a continuation-in-part of application Ser. No. 455,765, filed Mar. 28, 1974, by Robert Franklin Cobaugh and James Ray Coller and entitled "Method and Apparatus For Precrimping Solder Rings On Electrical Terminal Posts", now abandoned.

BACKGROUND OF THE INVENTION

This invention relates generally to methods of presoldering terminal posts that are subsequently fitted into substrates or circuit boards and soldered thereto, and more particularly the invention relates to a method of placing solder rings around terminal posts while said terminal posts are still secured to a common carrier strip.

In modern electronic technology, it is a common practice to insert terminal posts through plated-through holes in printed circuit boards and then to solder the posts to the walls of the plated-through hole. Because it is difficult to provide enough solder in the plated-through hole to make a strong solder connection with the terminal posts, it is sometimes necessary to add additional solder. Various techniques have been developed to provide such additional solder. Some of these techniques involve the placing of solder on the terminal posts at the point where the post will eventually make contact with the plated-through hole in the printed circuit board, but before the post is inserted in the printed circuit board. Then, by reflow techniques or the application of heat, the solder connections between terminal posts and circuit board is made.

One of the more recent developments on placing solder on terminal posts prior to insertion in a printed circuit board is the select solder technique described in a patent application Ser. No. 306,498 filed Nov. 14, 1972, by Robert Franklin Cobaugh and Kenneth Ronald Palmer and entitled "Selectively Applied Flowable Solder Apparatus Product And Method Of Fabrication". In essence, this technique involves the passing of the terminal posts, all of which are attached to a common carrier strip through a wave of solder whose area of contact with the terminal post is restricted by means of Teflon material barriers, which restrict the wave of solder to only that portion of the terminal posts to be coated with solder.

The foregoing technique has proven to be very successful commercially, particularly in applications where the terminal post fits rather precisely within the hole in the printed circuit board so that the solder deposited on the terminal post is adequate to form a solder joint completely around the pin and to the walls of the printed circuit board plated-through hole.

In some applications, however, and particularly those where the posts do not always fit snugly within the circuit board aperture provided therefore, a greater quantity of solder is needed. In such instances, solder doughnuts, or torus shaped rings of solder, are predeposited on the terminal posts before the post is inserted into the printed circuit board. Heat is then provided to the solder ring and makes the connection between the post and the circuit board. This technique, however, has in the past been very expensive in that it is difficult to place the solder doughnut on the terminal posts. More specifically, automation of the technique has presented difficult problems. Its most prevalent use to date has been the placing of the doughnuts on the terminal posts manually in applications where each terminal post is inserted individually.

BRIEF STATEMENT OF THE INVENTION

A primary object of the present invention is a fast and inexpensive method of crimping solder rings around terminal posts prior to their being inserted in a printed circuit board.

A second purpose of the invention is a fast and inexpensive method of crimping solder rings around terminal posts while the terminal posts are still carried on a common strip carrier and before insertion of the posts in the printed circuit board.

A third aim of the invention is a rapid and inexpensive method of crimping solder rings around terminal posts while the terminal posts are still on a common carrier strip and by means of continuously moving the strip through the solder crimping apparatus.

A fourth purpose is the improvement generally of placing solder rings around terminal posts generally.

In accordance with one form of the invention the solder rings are crimped onto the carrier held terminal posts by the steps of: heating the strip of contacts; simultaneously moving the heated strip of terminal posts and solder ribbon, positioned vertically to said terminal posts, through a first pair of rollers so that said heated terminal posts partially melt the solder ribbon and penetrate into the edge of, but not through the solder ribbon; cooling the strip of terminal posts with the solder ribbon attached thereto; and crimping the solder adjacent the terminal posts around said terminal posts by passing the terminal posts with the solder ribbon attached through a set of crimping rollers.

In accordance with the apparatus which performs the method of the invention, and which forms a part of the invention, there is provided a heating means for heating the carrier held strip of terminal posts as it passes through said heating means. A first pair of rollers function to simultaneously receive the heated strip of terminals and a flat ribbon of solder positioned vertically with respect to the terminal posts, and to press the terminal posts into said strip of solder so that the heated strip of terminal posts become embedded in the strip of solder.

The strip of carrier held terminals with the solder now attached is then passed into a second pair of rollers, which are crimping rollers, and which crimp the solder ribbon between adjacent terminals to further force the solder around each terminal, but without completely separating the solder ribbon between the terminals.

The terminal posts can now be gang inserted into a printed circuit board and when they are heated, or solder reflowed, the solder ring around each terminal post will flow into the aperture between the terminal post and the wall of the circuit board aperture to effect both a good electrical and a good mechanical connection therebetween. More specifically, because of surface tension characteristics, the solder between each terminal post of the gang inserted terminal posts, will completely separate.

In accordance with another form of the invention no heating of the strip of terminal posts is needed. Instead, the solder ribbon is first notched at periodic intervals corresponding to the spacing of the terminal posts and then the notched solder ribbon and the terminal posts are passed simultaneously through crimping rollers, wherein the solder is crimped over the terminals.

In both forms of the method invention the crimping step can either completely cut through the solder ribbon or it can cut only part way through. Further, the solder ribbon can contain flux internally or flux can be coated on the surface of the solder ribbon, or both.

In accordance with a feature of the form of the invention wherein the strip of terminal posts are heated, the final crimping stage is not always necessary. After the first step has been performed, that is the step wherein the heated terminal posts are embedded into the solder ribbon, the solder around each terminal post will separate from the solder around the adjacent terminal post and will flow into the aperture into which the terminal post is inserted to form good electrical and mechanical connections. The final crimping step ensures with more certainty that there will always be complete separation between the solder around adjacent terminal posts, and further ensures that the same amount of solder will be allocated to each terminal post when solder reflow occurs after the terminal posts have been gang inserted into a printed circuit board.

BRIEF DESCRIPTION OF THE DRAWINGS

The above-mentioned and other objects and features of the invention will be more fully understood from the following detailed description thereof when read in connection with the drawings in which:

FIG. 3 is a profile view of the perimeters of the two rollers of said first pair of rollers;

FIG. 3A is a side view of the structure of FIG. 1;

DETAILED DESCRIPTION OF THE INVENTION

Figure 1:
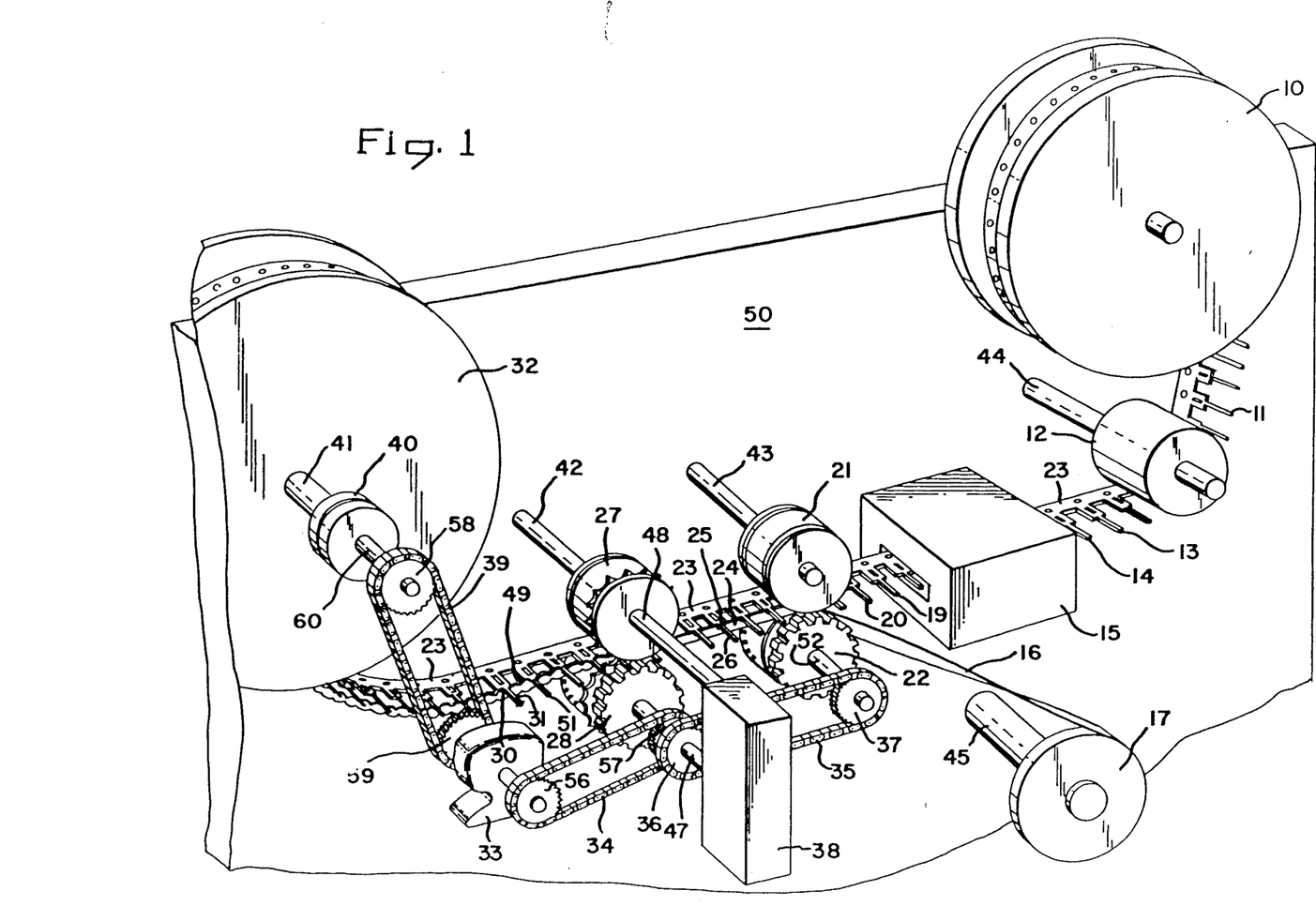
FIG. 1 is a perspective view of the apparatus which performs the method of the invention.

Referring now to FIG. 1, the strip of carrier held contacts are initially scored upon a reel 10, and by power driven means to be described later herein, is caused to be unreeled from reel 10 and around the idler guide wheel 12 which is supported to a main chassis 50 through shaft 44.

Two identical terminal posts 13 and 14 are shown attached to the carrier strip 23 as it leaves idler guide wheel 12. The strip of terminal posts then enters the heating chamber 15 which functions to heat the strip of terminal posts to a temperature which will cause the terminal posts to melt the solder ribbon 16 as both the terminal posts, such as terminal posts 19 and 20, and the solder ribbon 16 are passed between the pair of rollers 21 and 22.

Figure 2:
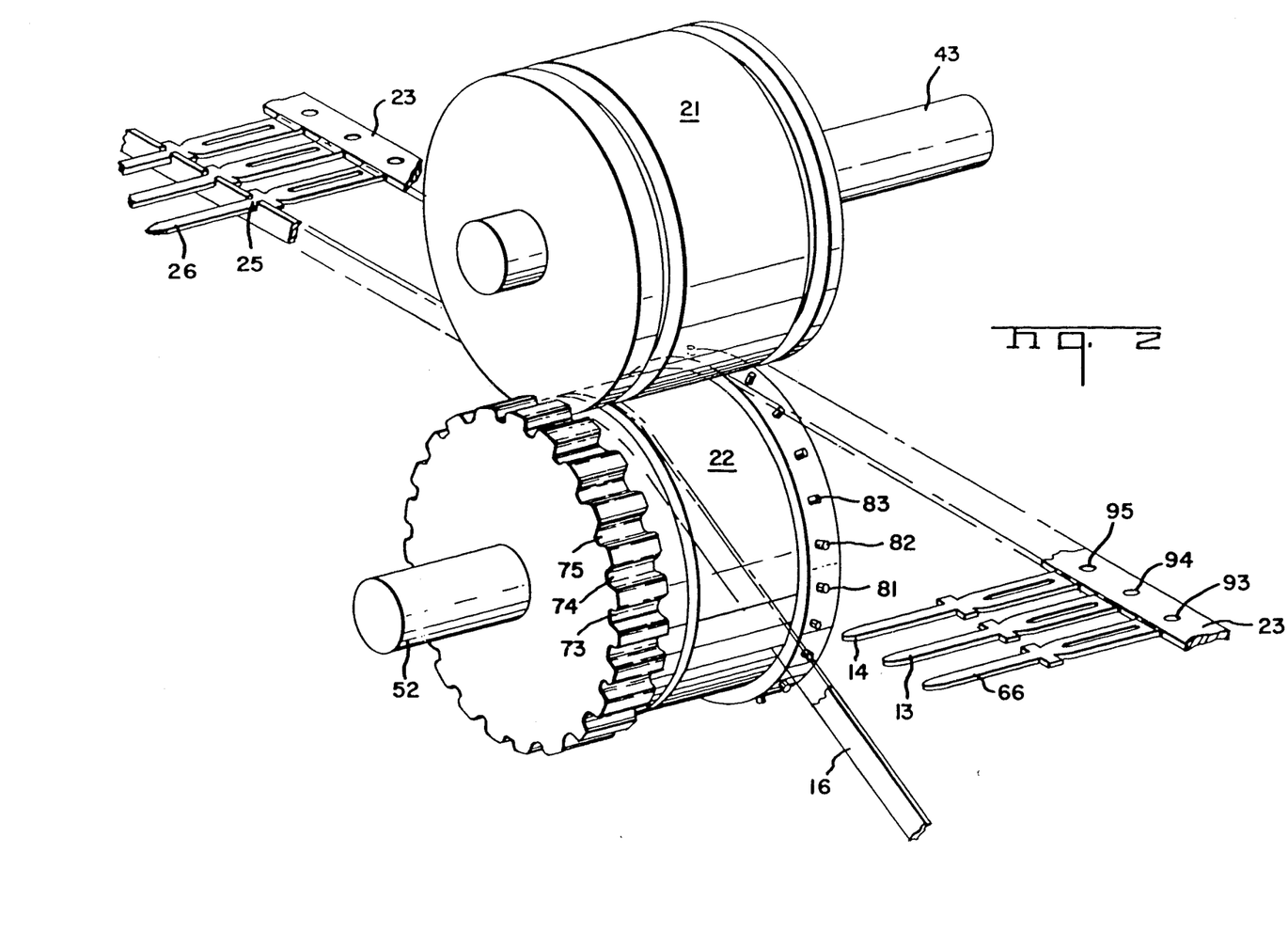
FIG. 2 is a blown-up perspective view of a strip of terminal posts and a solder ribbon passing through the first pair of rollers, during which the heated terminal posts become embedded in the solder ribbon.

The details of the construction of the perimeters of the rollers 21 and 22 are shown in FIGS. 2, 3 and 3A and will be discussed in more detail later herein. For the present assume that the heated terminal posts will melt the solder ribbon to produce the result shown by reference characters 24, 25 and 26.

More specifically, it can be seen that the terminal post 26 has melted the solder ribbon 24 and has thereby become embedded therein, as shown at point 25 in FIG. 1. During the time that the carrier strip passes from the pair of rollers 21 and 22 to the next pair of rollers 27 and 28, the terminal posts have become cooled and the solder ribbon has become solidified to form a good solder bond with the terminal posts.

Figure 4:
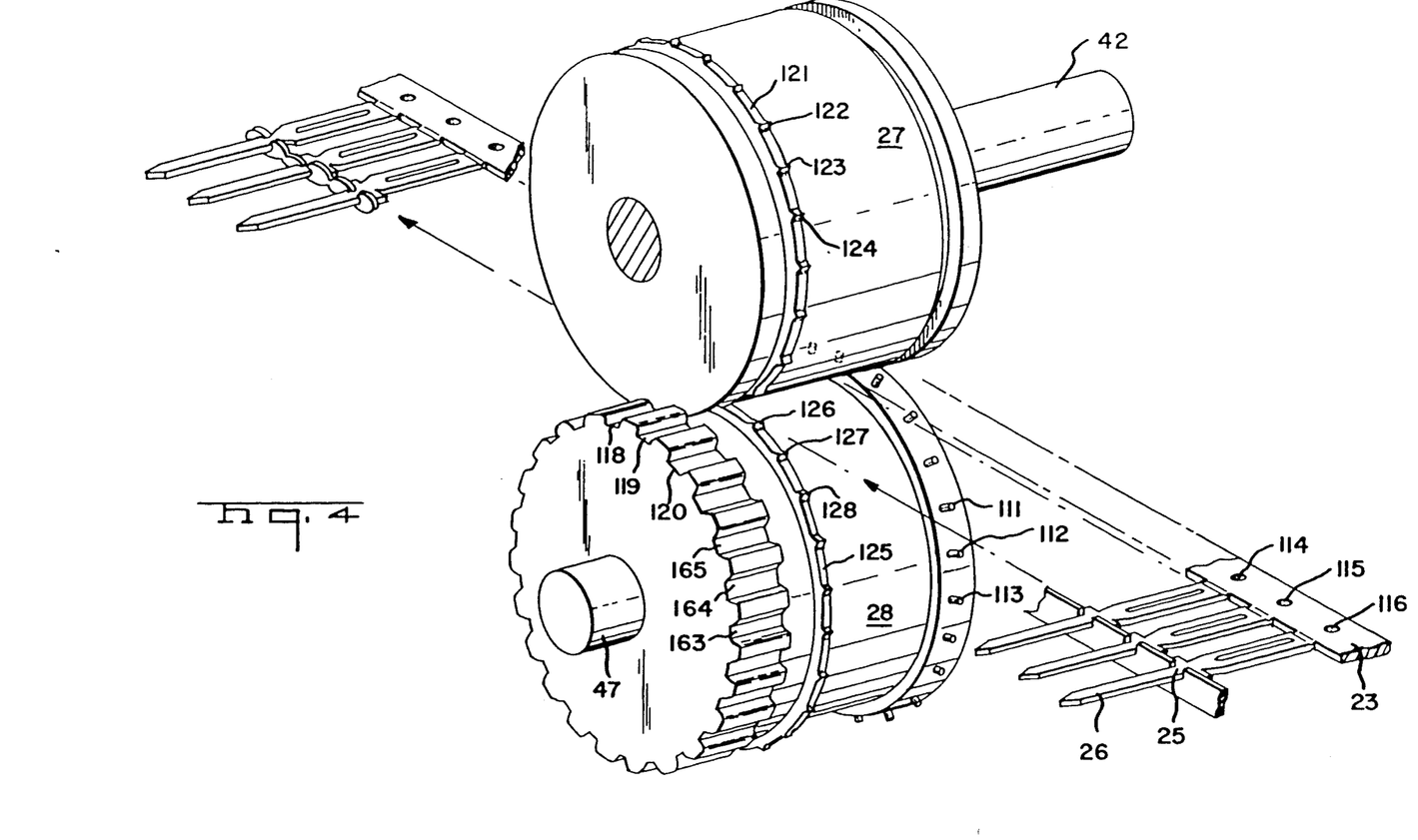
FIG. 4 is a blown-up perspective view of the second pair of rollers which perform the function of crimping the solder around the terminal posts of the strip of terminal posts.
Figure 5:
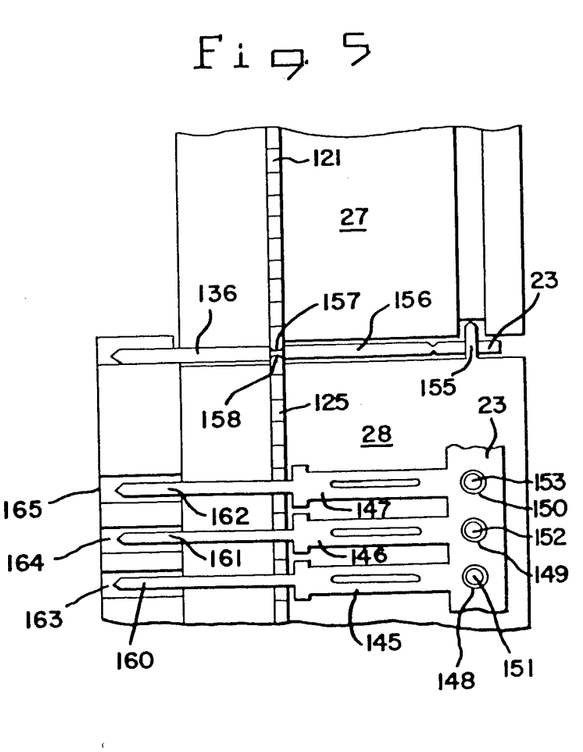
FIG. 5 is a profile of the perimeter of the crimping rollers of FIG. 4.
Figure 5A:
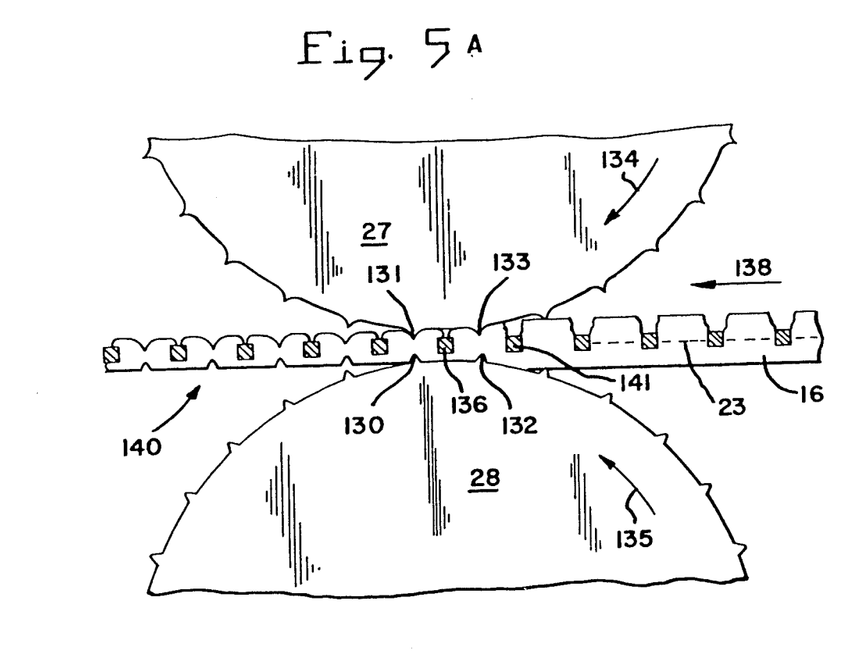
FIG. 5A is a side view of the profile of FIG. 5.

Thus by the time the strip of terminal posts embedded in the solder ribbon reaches the pair of crimping wheels 27 and 28, the structure is completely solidified and ready for the crimping process performed by crimping rollers 27 and 28. The details of the crimping rollers 27 and 28 are shown in FIGS. 4, 5 and 5a which will be discussed later herein. For the present purposes only the result of the crimping process will be discussed in connection with FIG. 1. Such result of the crimping step can be seen by examination of terminal 31, for example, and the surrounding solder 30. It can be seen in this localized area that the solder ribbon has been crimped together in between adjacent terminals such as adjacent terminals 31 and 51. For example, a crimping of the solder ribbon occurs at point 49 and assures that when the terminal posts are gang inserted into the printed circuit board and solder reflowed, the solder ribbon will separate at these crimped points, such as crimped point 49, so that the same amounts of solder will flow in and around each terminal post in the circuit board aperture in which it is inserted.

The completed product is stored on reel 32 until it is ready for insertion into a printed circuit board application or whatever application is desired.

Consider now the various driving means for the pair of rollers 21 and 22, the crimping rollers 27 and 28, the source reel 10, the take-up reel 32, and also the ribbon solder reel source 17.

It is not necessary to positively drive the source reel 10, the idler roller 12, the idler roller 21, or the solder reel 17. The carrier held strip of terminal posts can be pulled from source wheel 10 by means of the first pair of rollers 21 and 22 which can be driven by a power drive consisting of motor 33, and chains 34 and 35, which connect motor source 33 to shaft 47 and which drives shaft 47 and then to shaft 52 which drives the roller 22. As mentioned above, the upper roller 21 of the first pair of rollers need not be driven. It is an idler roller and is designed to follow the movement of the driven lower roller 22.

However, with respect to the pair of crimping rollers 27 and 28, both rollers must be driven and, furthermore, they must be driven phase synchronously. It is evident from FIG. 1 that the bottom of crimping roller 28 is driven directly from motor 33 by chain 34 between sprocket wheels 56 and 57. The block identified by reference character 38 is a synchronizing gear box and maintains the rotation of the upper crimping roller 27 in exact phase synchronism with the lower crimping roller 28. The reason for such exact phase synchronism will be more readily understood from FIGS. 4, 5 and 5a, which will be discussed later herein.

It is also necessary that the velocity of the perimeter of the roller 28 be exactly the same as the velocity of the perimeter of the driven roller 22. To provide such a one-to-one perimetrical velocity there is provided a chain 35 which connects sprocket gears 36 and 37.

The take-up reel 32 should have a perimeter velocity, which if free running, would be slightly greater than the perimeter velocity of roller 28 in order to take up the strip of contacts as it emerges from between the two crimping rollers 27 and 28.

To provide the foregoing function the chain 39 drives the reel 32 from sprocket 59 of motor 33 to sprocket 58 on shaft 60 of take-up reel 32. The immediate result, i.e., the unchecked result, of this arrangement is that the perimetric velocity of take-up reel 32 is always greater than the perimetric velocity of roller 28, no matter what amount of carrier strip has been wound onto reel 32. A slip-clutch arrangement 40 is provided in between drive sprocket 58 and reel 32 so that the actual perimetric velocity of reel 32 is held back by the pull of the strip of contacts and remains equal to the perimetric velocity of roller 28.

Obviously, many other well known take-up reel arrangements can be employed whereby the angular velocity of take-up reel 32 varies in accordance with the amount of carrier strip it contains so that the amount of loose carrier strip between crimping wheels 27 and 28 and take-up reel 32 remains substantially constant.

In FIG. 3 there is shown the profiles of the first pair of rollers 21 and 22. A portion of FIG. 3 is unrealistic in that it doesn't actually occur in the operation of the apparatus. More specifically, the three contacts 90, 91 and 92 are shown as being wound around a portion of the drive roller 22, with the apertures 93, 94 and 95 in carrier strip 23 fitting down over pins 81, 82 and 83, which pins are formed upon the perimeter of roller 21. In fact, the strip of carrier held terminals never, in fact, becomes wound around the perimeter of roller 22; the strip only passes in between the rollers 21 and 22 as shown in FIG. 2. However, to better illustrate the physical relationship between the configuration of the perimeter of wheel 22 and the carrier strip 23, the three contacts 90, 91 and 92 are shown as being wrapped around a portion of the roller 22.

The pins 81, 82 and 83 are all similar to the pin 80, also shown in FIG. 3. Similar pins extend all the way around the perimeter of roller 22. Such pins 81, 82 and 83 are also shown in FIG. 2 and are spaced apart the same distance as are apertures 93, 94 and 95 in carrier strip 23, so that in effect, carrier strip 23 is sprocket driven by the pins such as pins 81, 82 and 83.

Similarly, in FIG. 3, the terminal posts portions 70, 71 and 72 of contacts 90, 91 and 92 lie in consecutive grooves 73, 74 and 75 of roller 22. Again it is to be noted that in fact no contact terminal posts are wrapped around roller 22 in the manner shown in FIG. 3. This portion of FIG. 3 is shown only to illustrate the dimensional relationship between the spacing of the terminal posts, the carrier strip and the grooves, such as grooves 73, 74 and 75 of roller 22.

However, the position of the contact 85, which is shown in FIG. 3 at the point where rollers 21 and 22 meet, does in fact occur in the actual operation of the system. At this point the solder strip 16 has been fed into the main slot formed by the joinder of the slots 98 and 99 in the perimeters of rollers 21 and 22, respectively. Since the contact 85 has been heated the terminal post 74 thereof will have melted a portion of solder strip 16 and become embedded therein, as shown at point 100 in FIG. 3.

A profile of the terminal post 74 embedded in solder strip 16 at point 100 is shown in FIG. 3A. Both the terminal strip 23 and the solder strip ribbon 16 move in the direction of arrow 105 in FIG. 3A. The resultant product is represented generally by terminal post 26 shown embedded in solder ribbon 16 after melted its way down into said solder ribbon and leaving a gap 25 in the solder.

Referring now to FIG. 4 there is shown an enlarged perspective view of crimping rollers 27 and 28. In FIG. 4 the terminals held on the carrier strip 23, which emerges from the first pair of roller wheels 21 and 22 of FIG. 2 with the solder ribbon attached thereto is supplied between crimping rollers 27 and 28, which are phase synchronously driven as discussed in connection with FIG. 1.

The lower crimping roller 28 has a series of pins around the right hand perimeter thereof, such as pins 111, 112 and 113, which pins are spaced apart the same distance as are the holes 114, 115 and 116 of carrier strip 23 and form a driving sprocket for said carrier strip 23.

The left hand side of the roller wheel 28 has grooves therein such as grooves 118, 119 and 120 in which the terminal posts of the contacts secured to carrier strip 23 lie as the strip of contacts is passed between the crimping rollers 27 and 28.

Each of the crimping rollers 27 and 28 has a crimping portion thereon. More specifically, the crimping portion of roller 27 is identified by reference character 121 and that of roller 28 is identified by reference character 125. Each of these crimping portions is characterized by a series of peaked portions such as peaks 122, 123 and 124 in roller 27 and peaks 126, 127 and 128 in roller 28.

These peaked portions are spaced an equal distance apart and furthermore, are phase synchronized so that a peak from each of the two rollers 27 and 28 will mate as they pass adjacent each other through the plane joining the axes of the two rollers 27 and 28. Worded in another way, the peaks of crimping rollers 121 and 125 will meet each other at the point where the two rollers 27 and 28 come together.

Reference is made to FIG. 5a which shows the relationship of the peaks of rollers 27 and 28 at the point where the rollers 27 and 28 meet. More specifically, as the terminals on carrier strip 23 which are embedded in solder ribbon 26 approaches rollers 27 and 28 in the direction of arrow 138, pairs of opposing peaks on rollers 27 and 28 will crimp into the solder ribbon 16 to form the solder configuration shown generally to the left of the two rollers 27 and 28 and identified by reference character 140.

More specifically, consider the pairs of opposing peaks 133 and 132 of rollers 27 and 28. These two opposing peaks 133 and 132 bear down into the solder ribbon 16 between the terminal posts 136 and 141 to push the solder ribbon 16 over the top of the terminal posts 136 and 141. The pair of opposing peaks 131 and 130 are shown leaving a crimp that they have just formed. The resultant product 140 is then rolled up on a take-up reel, such as the take-up reel 32 shown in FIG. 1.

FIG. 5 shows a profile of the crimping rollers 27 and 28. The crimping portions 121 and 125 of rollers 27 and 28 can be seen to be aligned and with the peaks 157 and 158 performing a crimping function with respect to contact 156. The carrier strip 23 is shown engaging the pin 155. A series of such pins extend completely around the roller 28 and form a sprocket for driving the carrier strip 23.

As in the case of FIG. 3 a series of three contacts 145, 146 and 147 are shown wrapped around the roller 28. Such a situation does not exist in the actual operation of this structure. Such situation is shown in FIG. 5 merely to illustrate the dimensional and space relationship between the carrier strip 23 and the contacts held thereon and the perimeter characteristics of the rollers 27 and 28. Specifically, in FIG. 5, the carrier strip 23 is shown as having three apertures or sprocket holes 148, 149 and 150 thereon which fit over pins 151, 152 and 153. The terminal posts 160, 161 and 162 of the contacts 145, 146 and 147 fit into guiding grooves 163, 164 and 165 of the roller 28.

Figure 6:
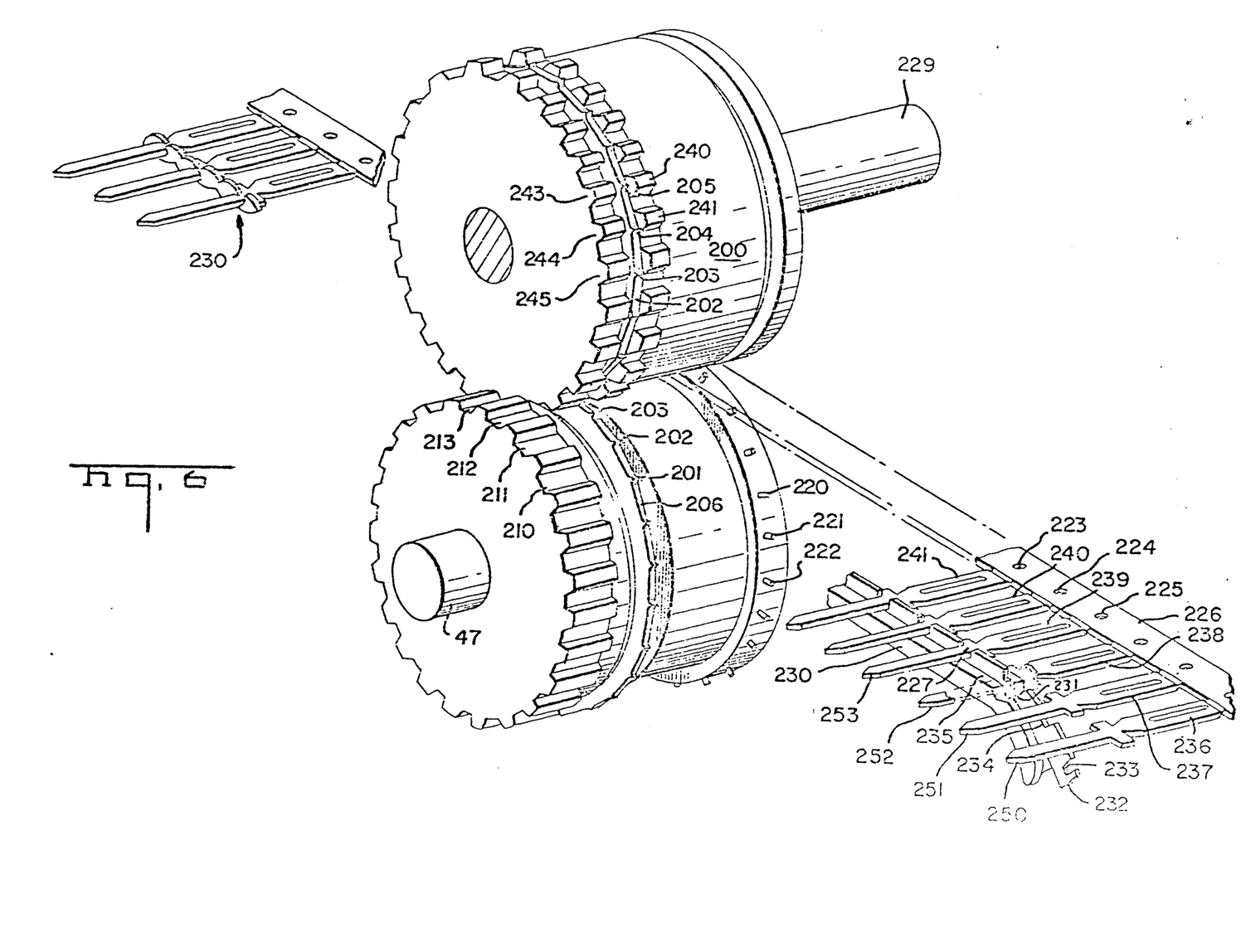
FIG. 6 is a perspective view of a pair of crimping rollers employed in the form of the invention wherein the solder ribbon is pre-notched.
Figure 7:
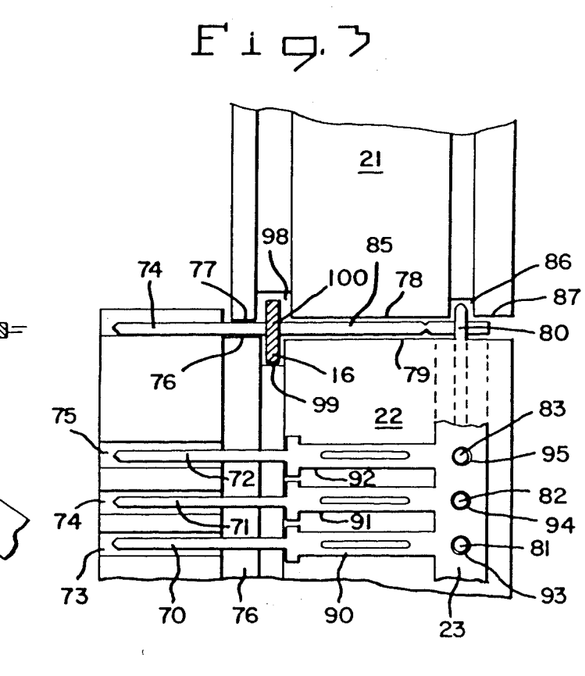
Figure 7A:
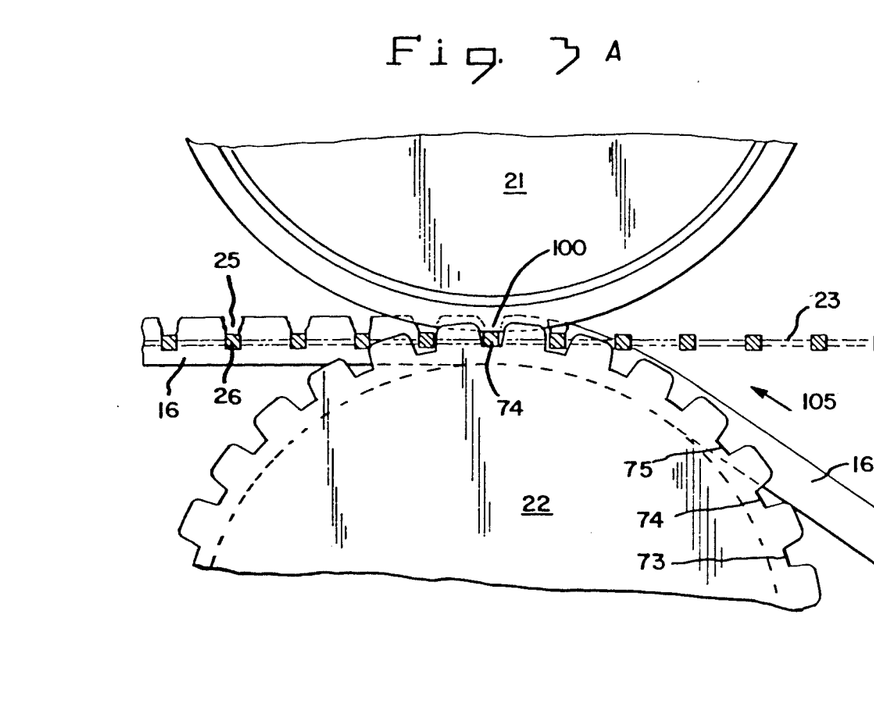

In FIG. 6 there is shown another form of the invention wherein the solder ribbon is pre-cut and is then crimped directly onto each post of a strip of terminal posts. More specifically, in FIG. 6 the solder ribbon 232 has notches, such as notches 233, 234 and 235 cut therein by means not shown.

The pre-notched ribbon of solder 232 is then supplied through some suitable guide means, such as the slot 231 in U-shaped guide means 235. Simultaneously, the strip of terminal posts, such as terminal posts 236 through 241, held on a common carrier strip 226, are also supplied in such a manner that the individual posts thereon, such as posts 250, 251, 252 and 253, slip into corresponding notches in the solder ribbon 232, as shown in FIG. 6.

The combination of the strip of terminal posts lying in the notches of the solder ribbon 232 is then supplied in-between the crimping rollers 200 and 201.

The said crimping rollers 200 and 201 each have a crimping section 202 and 206, respectively. These two crimping sections contain a series of equal spaced, peaked portions, identified by reference characters 203, 204, 205, on roller 200 and by reference characters 201, 202 and 203 on roller 201.

These peaked portions are phase synchronised in that corresponding peaked portions will meet at the tangential plane where the two rollers come substantially together.

The solder ribbon 232 passes between the crimping sections 202 and 206 and are crimped in-between the terminal posts held therein by the peaking portion described above on the two crimping sections 202 and 206.

On either side of the crimping element 202 are a series of guiding elements, such as guiding segments 243 – 245, 240 and 241, which function to retain the solder ribbon 232 in its proper position between the crimping sections 202 and 206. More specifically, on roller 200 there is shown a series of guiding segments, such as segments 243, 244 and 245 on the left hand side of crimping section 202 and guiding segments 240 and 241 on the right hand side of the crimping element 202. These guiding segments extend all the way around the perimeter of the crimping section 202 and function to retain the ribbon of solder 232 in a vertical position with respect to the terminal posts 251 – 253 while the assembly of solder ribbon and terminal posts passes between the two crimping rollers 200 and 201.

The resulting product appearing at the output of rollers 200 and 201 is identified generally by reference character 230. It can be seen that solder ribbon 232 is crimped in-between each of the terminal posts. Such crimping can be only partially through the solder ribbon or, if desired, it can sever the solder ribbon. The solder ribbon can be formed from a standard circular cross-section strip of solder, with a resin core, which has been pressed into a ribbon. For further ease of installation of the solder crimped terminal posts into printed circuit boards, additional solder flux can be coated externally on one side of the solder ribbon.

It is to be understood that the forms of the invention shown and described herein are but preferred embodiments thereof and that various changes may be made in the profile of the various rollers and in driving means and in other details without departing from the spirit or scope of the invention.

What is claimed is:

1. A method for placing solder rings on terminal posts secured to a common carrier comprising the steps of:

heating the terminal posts to a temperature adequate to melt solder; and transporting the heated terminal posts and a ribbon of solder simultaneously between a first pair of rollers having a perimetric profile constructed to press the heated terminals into the edge of, but not through, the solder ribbon which is positioned vertically with respect to said heated terminal posts.

2. A method in accordance with claim 1 and further comprising the step of:

storing the carrier held terminal posts with the solder ribbon attached thereto in a storage means.

3. A method in accordance with claim 1 and further comprising the step of coating at least one side of the solder ribbon with solder flux to facilitate soldering the terminal posts in a substrate board.

4. A method in accordance with claim 1 comprising, after said transporting step, the further step of:

passing the carrier held terminal posts with the solder ribbon attached thereto through a second pair of rollers having a circumferential surface constructed to crimp the solder ribbon between the terminal posts to force the solder further around said terminal posts to ensure an equal distribution of solder around each terminal post when the terminal posts are gang inserted in a circuit board and the solder reflowed.

5. A method in accordance with claim 4 in which the step of crimping the solder ribbon between the terminal posts completely severs the solder ribbon.

6. A method for placing solder rings on terminal posts secured to a common carrier comprising the steps of:

heating the terminal posts to a temperature adequate to melt solder;

pressing the heated terminal posts into the edge of a ribbon of solder by means of a first pair of rollers having a perimetric profile constructed to receive therebetween the heated terminals and solder ribbon which is vertically positioned with respect to said terminal posts.

7. A method in accordance with claim 6 comprising the further step of:

crimping the solder ribbon between said terminal posts to force the solder further around the terminal posts and to ensure a substantially equal distribution of solder around each terminal post when the terminal posts are gang inserted in a circuit board and heated.

8. A method in accordance with claim 7 in which the step of crimping the solder ribbon between the terminal posts completely severs the solder ribbon.

9. A method in accordance with claim 7 and further comprising the step of coating at least one side of the solder ribbon with solder flux to facilitate soldering the terminal posts in a substrate board.

10. A method in accordance with claim 6 comprising the further step of:
  winding the carrier held strip of terminal posts with the solder ribbon attached thereto upon a take-up reel.

11. A method for placing a ring of solder at least part way around each of a plurality of terminal posts secured to a common carrier and comprising:
  heating said terminal posts to a temperature adequate to melt solder;
  passing said carrier held heated terminal posts between a pair of rollers;
  simultaneously passing a ribbon of solder between said rollers with said ribbon of solder being positioned vertically with respect to each of said terminal posts simultaneously passed between said rollers;
  pressing said heated terminal posts into said vertically positioned solder posts as they simultaneously pass between said pair of rollers; and
  passing said carrier held terminal posts with the attached vertically positioned solder ribbon between a second pair of rollers which crimp the solder ribbon between terminal posts to force the solder more completely around the terminal posts.

12. A method for placing solder rings on terminal posts secured to a common carrier comprising the steps of:
  heating the terminal posts to a temperature adequate to melt solder; and
  pressing the heated terminal posts into the edge of, but not through, a ribbon of solder which is positioned vertically with respect to said heated terminal posts.

13. A method in accordance with claim 12 and further comprising the step of coating at least one side of the solder ribbon with solder flux to facilitate soldering the terminal posts in a substrate board.

14. A method in accordance with claim 12 comprising the further step of:
  crimping the solder ribbon between the terminal posts to force the solder further around the terminal posts to ensure a substantially equal distribution of solder around each terminal post when the solder is melted.

15. An apparatus for placing solder rings at least partially around elongated contacts secured to a common carrier strip and comprising:
  heating means for heating said elongated contacts sufficiently to melt solder;
  a first pair of roller means having parallel axes and positioned so that their cylindrical surfaces face each other in the plane joining said two axes thereof;
  a ribbon of solder;
  means for supplying said carrier held elongated contacts and said ribbon of solder between said first pair of roller means;
  said first pair of rollers having the cylindrical surfaces constructed to receive said ribbon of solder and said strip of elongated terminals in a plane and to press said heated elongated terminals into the edge of, but not through, said ribbon of solder as said elongated terminals and said ribbon of solder pass between said first pair of roller means.

16. An apparatus in accordance with claim 15 further comprising:
  a second pair of roller means having parallel axes and positioned with their cylindrical surfaces facing each other in the plane passing through said two axes;
  means for supplying said carrier held elongated contacts with the attached ribbon of solder between said second pair of rollers;
  said second pair of rollers having their cylindrical surfaces constructed to crimp the solder ribbon between adjacent elongated contacts to force the solder further around said elongated terminals and to ensure that substantially equal amounts of solder will be distributed around each elongated terminal when said solder is melted.

17. An apparatus for placing solder rings at least partially around terminal posts which are secured to a common carrier strip and comprising:
  a heating means;
  means for supplying said terminal posts to said heating means where said terminal posts are heated sufficiently to melt solder;
  a first pair of roller means having parallel axes and positioned so that their cylindrical surfaces face each other in the plane joining said parallel axis;
  a ribbon of solder;
  means for passing said carrier held terminal posts and said ribbon of solder between said first pair of roller means;
  said first pair of roller means having cooperative perimetric profiles constructed to receive said ribbon of solder with the plane of said ribbon positioned substantially normal to said axes and further constructed to receive said carrier held strip of terminal posts in a plane substantially parallel to said axes and to press said heated terminal posts into the edge of said ribbon of solder as said terminal posts and said ribbon of solder pass between said first pair of roller means.

18. An apparatus in accordance with claim 17 further comprising:
  a second pair of roller means having parallel axes and positioned with their cylindrical surfaces facing each other in the plane joining said two axes together;
  means for supplying said carrier held terminal posts with the attached ribbon of solder between said second pair of rollers;
  said second pair of rollers having cooperative perimetric profiles constructed to crimp the solder ribbon between adjacent terminal posts to force the solder further around the terminal posts and to ensure that substantially equal amounts of solder will be distributed around each terminal post when said solder is melted.

19. An apparatus for positioning solder rings at least partially around elongated contacts secured to a common carrier strip and comprising:
   heating means for heating said elongated contacts sufficiently to melt solder;
   a first pair of surfaces positioned to face each other;
   a ribbon of solder;
   means for positioning said carrier held terminal posts and said ribbon of solder between said first pair of surfaces with the plane of said solder ribbon being substantially normal to said surfaces and to said terminal posts;
   said first pair of surfaces being configured to press said heated terminal posts into the edge of, but not through, said ribbon of solder so that said ribbon of solder becomes attached to said elongated contacts; and
   driving means for supplying continuously connected sections of said ribbon of solder and said carrier held strip of contacts between said first pair of surfaces.

20. An apparatus in accordance with claim 19 further comprising:
   a second pair of surfaces positioned to face each other;
   means for supplying said carrier held terminal posts with the attached ribbon of solder between said second pair of surfaces;
   said second pair of surfaces being configured to crimp the solder ribbon between adjacent terminal posts to force the solder further around the terminal posts and to ensure that substantially equal amounts of solder will be distributed around each terminal post when said solder is melted.

21. A method for placing solder rings on terminal posts secured to a common carrier comprising the steps of:
   forming notches in a ribbon of solder;
   positioning the individual terminal posts of a carrier held strip of terminal posts in said notches in said notched solder ribbon and with the plane of the solder ribbon substantially normal to the direction of the terminal posts; and
   passing the assembly comprising the carrier held terminal posts positioned in the notches in the solder ribbon through a pair of rollers having a perimetric profile constructed to crimp the solder ribbon between the terminal posts to force sections of the solder ribbon around said terminal posts to ensure an equal distribution of solder around each terminal post when the terminal posts are gang inserted in a circuit board and heated.

22. A method in accordance with claim 21 and further comprising the step of coating at least one side of the solder ribbon with solder flux to facilitate soldering the terminal posts in a substrate board.

23. A method in accordance with claim 21 in which the step of crimping the solder ribbon between the terminal posts completely severs the solder ribbon.

24. A method for placing solder rings on terminal posts secured to a common carrier at predetermined spacing therealong and comprising the steps of:
   forming notches in the edge of a ribbon of solder at predetermined points along the length thereof corresponding to said predetermined spacing between the said terminal posts;
   bringing together the terminal posts and the notched solder ribbon in substantially normal planes so that the individual terminal posts fit into the notches of said solder ribbon; and
   passing the ribbon with the terminal posts positioned in the notches thereof through a pair of rollers constructed to crimp the solder ribbon between the terminal posts to force a section of the solder ribbon around each terminal post.

25. A method in accordance with claim 24 and further comprising the step of coating at least one side of the solder ribbon with solder flux to facilitate soldering the terminal posts in a substrate board.

26. A method in accordance with claim 24 in which the step of crimping the solder ribbon between the terminal posts completely severs the solder ribbon.

27. An apparatus for placing solder rings at least partially around elongated contacts secured to a common carrier strip and comprising:
   a first pair of roller means having parallel axes and positioned so that the cylindrical surfaces face each other in the plane joining together said two axes;
   a ribbon of solder having notches pre-formed therein at predetermined space intervals;
   means for supplying said carrier held elongated contacts and said ribbon of solder between said first pair of roller means, with the elongated contacts lying in said notches in said solder ribbon;
   said roller means having their cylindrical surfaces configured to receive said ribbon of solder and said strip of elongated contacts in substantially perpendicular planes and to crimp said ribbon of solder at points between said elongated contacts to force segments of said solder ribbon at least partially around each elongated contact.

* * * * *